United States Patent [19]
Chung

[11] Patent Number: 5,550,418
[45] Date of Patent: Aug. 27, 1996

[54] ALTERNATOR FOR USE IN AN AUTOMOBILE

[75] Inventor: Jong-Won Chung, Kyungsangbuk-Do, Rep. of Korea

[73] Assignee: Mando Machinery Corp. Ltd., Kunpo, Rep. of Korea

[21] Appl. No.: 365,724

[22] Filed: Dec. 28, 1994

[30] Foreign Application Priority Data

Dec. 29, 1993 [KR] Rep. of Korea .................. 93-30511

[51] Int. Cl.⁶ ........................................... H02K 13/00
[52] U.S. Cl. ........................ 310/239; 310/58; 310/71; 310/89; 310/232; 310/249
[58] Field of Search .................................. 310/239, 232, 310/88, 59, 58, 89, 71, 249

[56] References Cited

U.S. PATENT DOCUMENTS 3,686,514  8/1972  Dube ................................ 310/232
5,424,600  6/1995  Ishikawa ........................... 310/59

Primary Examiner—R. Skudy
Attorney, Agent, or Firm—Anderson Kill Olick & Oshinsky, P. C.

[57] ABSTRACT

An alternator for use in an automobile comprises a first frame, a second frame, a stator, a shaft, a rotor, a current supply system and fans. The shaft is rotatably coupled to the first frame and the second frame, and extends outwardly beyond the first frame. The current supply system has a pair of slip rings, a pair of brushes and a brush holder. The slip rings are fixed to the shaft, and are electrically connected to a coil of the rotor. The brushes are urged against and in slidable contact with the slip rings, respectively. The brush holder is fixed to the first frame for retaining the brushes; and has a slip ring shield portion for covering and protecting the slip rings. The slip ring shield portion has openings which allow dust produced by the wearing of the brushes to be blown by the action of fans.

4 Claims, 4 Drawing Sheets

5,550,418

ALTERNATOR FOR USE IN AN AUTOMOBILE

FIELD OF THE INVENTION

The present invention relates to an alternator for use in an automobile; and, more particularly, to a current supply system of an alternator capable of preventing a short-circuiting or electric failure therein.

DESCRIPTION OF THE PRIOR ART

As is well known, an alternator for use in an automobile serves to generate an AC current through the electromagnetic cooperation of a stator and a rotor therein. An exciting current is supplied to the rotor via a current supply system which has brushes, slip rings and wire leads.

The current supply system of the alternator should meet several requirements. Since the brushes slide on surfaces of the slip rings to supply the exciting current, dust may be produced by the wearing of the brushes. The brush dust may in turn cause a short-circuiting or electric failure in the current supply system. Accordingly, it is necessary to design the current supply system to be able to discharge or get rid of the brush dust.

Another requirement of the current supply system lies in its ability to shield or protect it against contaminants, e.g., moisture or oil. Such contaminants may also disrupt or deteriorate the electric conductivity characteristics between the brushes and the slip rings.

Further, it is required that the wire leads of the current supply system provide an electric connection Between the slip rings and the rotor coil without failure. For the leads rotate along with the rotor; and, therefore, they tend to be damaged due to the frictional contact with a stationary part of the alternator. Accordingly, the current supply system should be structured so as to prevent the leads from being damaged or disconnected.

SUMMARY OF THE INVENTION

Accordingly, it is an object of the present invention to provide an alternator adapted to discharge dust produced by the wearing of brushes.

It is another object of the present invention to provide an alternator with a protective shield capable of preventing contaminants from flowing into a current supply system thereof.

It is a further object of the present invention to provide an alternator configured to protect wire leads in the current supply system against damage or alienation.

The above and other objects of the present invention are accomplished by providing an alternator for use in an automobile, which comprises:

a first frame having apertures;

a second frame engaged to the first frame;

a stator positioned between the first and the second frames;

a shaft coupled to the first and the second frames, the shaft including a first portion positioned between the first and the second frames and a second portion extending outwardly from the first portion and beyond the first frame, the shaft being rotatable with respect to the first and the second frames about an axis thereof;

a rotor mounted on the shaft, the rotor including a rotor core and a rotor coil for establishing an electromagnetic cooperation with the stator;

a pair of slip rings fixed to the second portion of the shaft, each of the slip rings being electrically connected to the rotor coil;

a pair of brushes, each of the brushes being urged against and in slidable contact with each of the slip rings;

a brush holder mounted to the first frame for retaining the brushes, the brush holder including a slip ring shield portion, the slip ring shield portion having a first opening distant to the first frame and a second opening adapted to serve as a passage for the slip rings and the shaft, the second opening being in communication with one of the apertures of the first frame; and means for circulating air through the first and the second openings of the brush holder.

BRIEF DESCRIPTION OF THE DRAWINGS

The above and other objects, advantages and features of the present invention will be apparent from the following description of preferred embodiments taken in conjunction with the accompanying drawings, wherein.

DETAILED DESCRIPTION OF THE PREFERRED EMBODIMENTS

Figure 1:
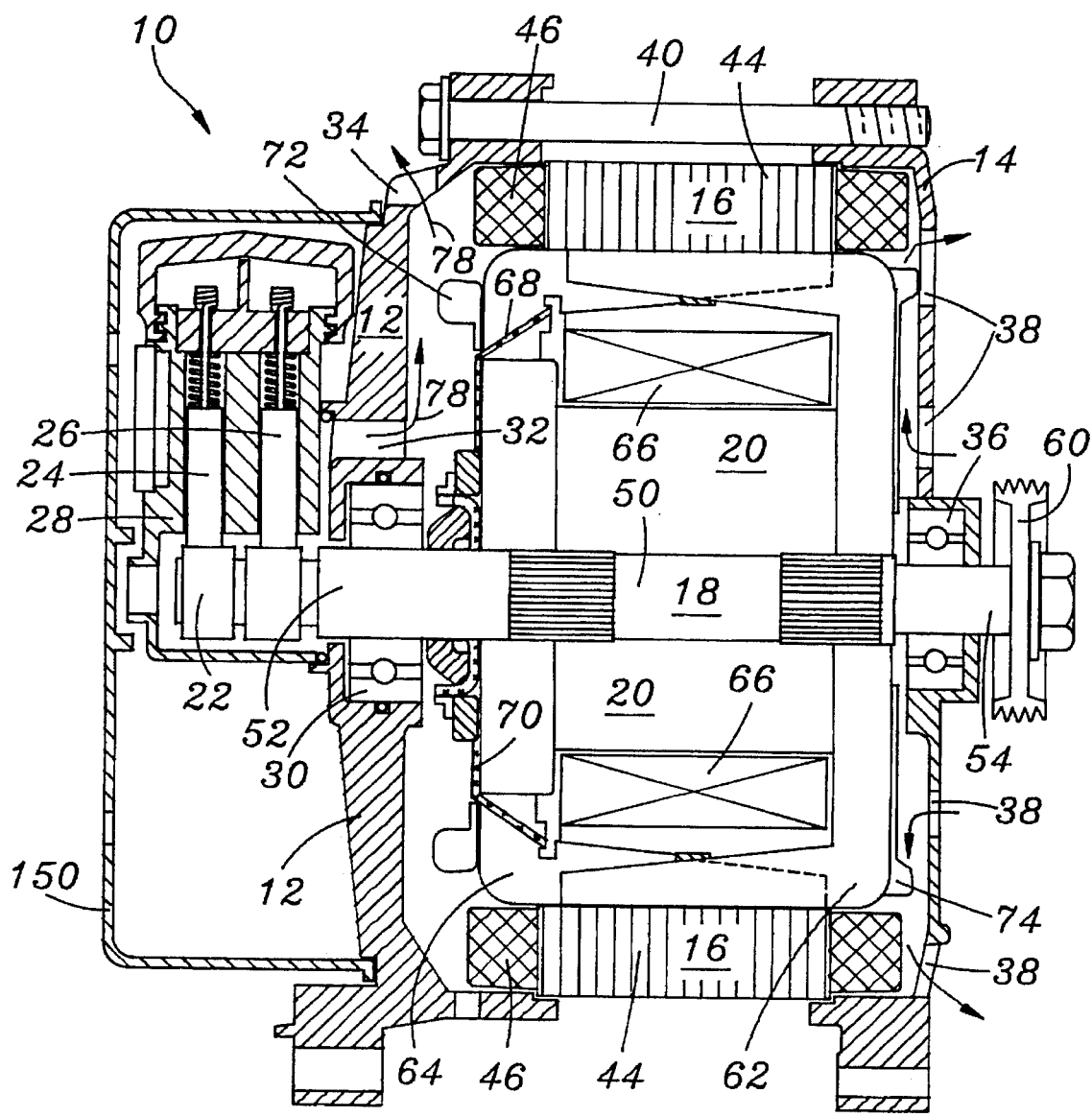
FIG. 1 is a sectional view of an alternator in accordance with the present invention.

Referring to FIG. 1, there is shown an alternator 10 in accordance with the present invention. As illustrated, the alternator 10 includes a first frame 12, a second frame 14, a stator 16, a shaft 18, a rotor 20, and a current supply system. The current supply system has a slip ring assembly 22, a pair of brushes 24, 26 and a brush holder 28.

The first frame 12 is substantially C-shaped; and has a bearing 30 positioned at a central portion thereof, a first aperture 32 and a second aperture 34 through which air is allowed to flow. Similarly, the second frame 14 is C-shaped; and has a bearing 36 and apertures 38. The first and the second frames 12, 14 are coupled to each other by a plurality of bolts 40 to constitute an outer shell of the alternator. The frames 12, 14 are made of, e.g., an aluminum alloy.

The stator 16 is mounted to and positioned between the first frame 12 and the second frame 14. The stator 16 has a stator core 44 and a stator coil 46 wound around the stator core 44 as well known in the art.

Figure 2:
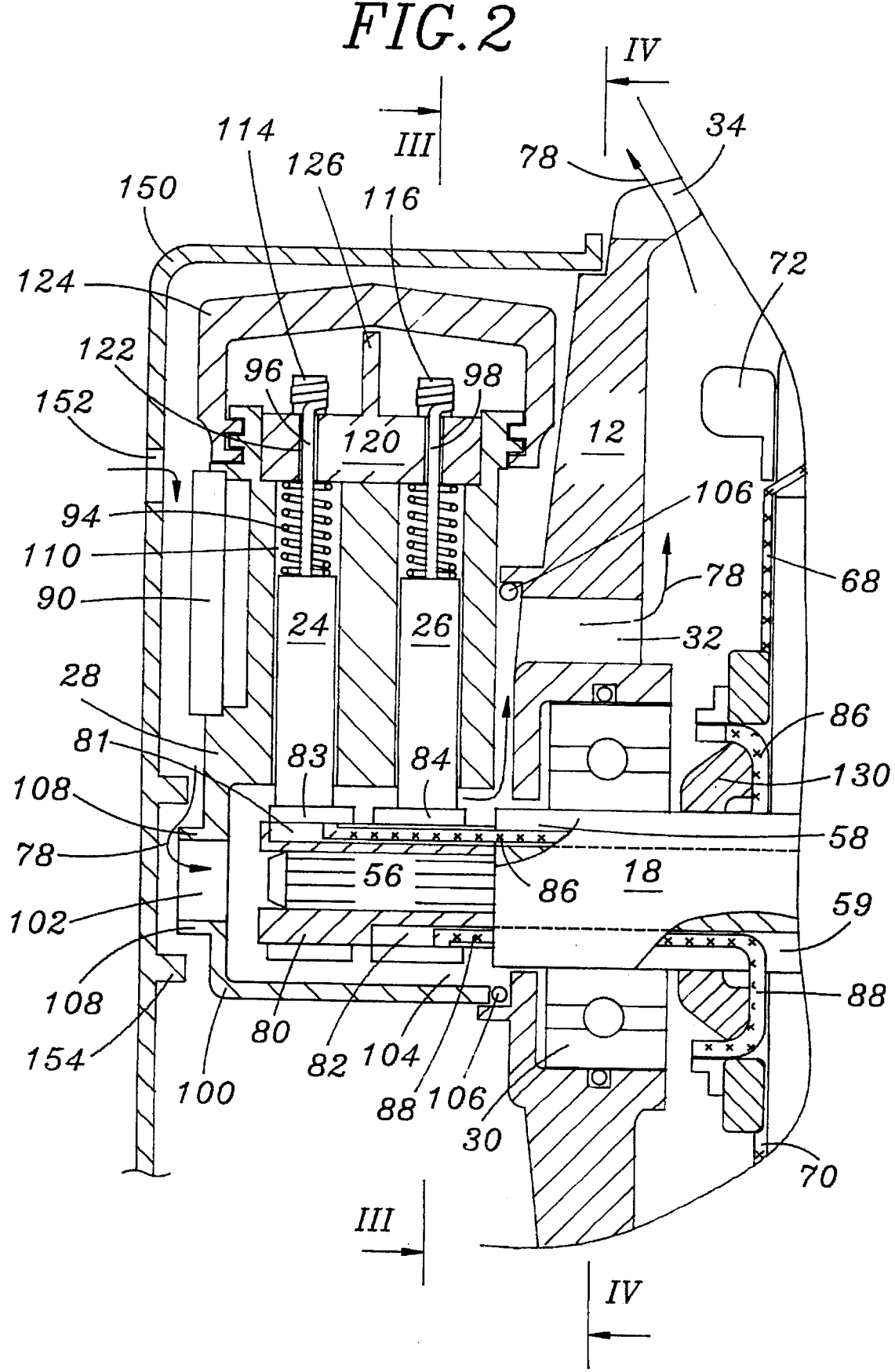
FIG. 2 illustrates an enlarged sectional view of the current supply system shown in FIG. 1.

Still referring to FIG. 1, the shaft 18 is coupled to and supported by the bearings 30, 36 of the first and the second frames 12, 14; and is rotatable with respect to the frames 12, 14 about an axis thereof. The shaft 18 has a first portion 50 positioned between the first and the second frames 12, 14; a second portion 52 extending outwardly from the first portion 50 and beyond the first frame 12; a third portion 54 projecting outwardly from the first portion 50 and beyond the second frame 14. A pulley 60 is mounted on the third portion 54 of the shaft 18. An engine of the automobile is dynamically connected to the shaft 18 through the pulley 60 and a V-belt(not shown). As shown in FIG. 2, the second portion 52 of the shaft 18 has a serrated end 56 with a reduced diameter. The shaft 18 has a pair of axial channels 58, 59 extending from the second portion 52 to the first portion 50.

Referring back to FIG. 1, the rotor 20 is mounted to the first portion 50 of the shaft 18. The rotor 20 has a pair of pole cores 62, 64 for establishing an electromagnetic cooperation with the stator 16; a rotor coil 66 wound and positioned between the pole cores 62, 64; and coil leads 68, 70 connected to the rotor coil 66. Fans 72, 74 are fixed to the sides of the rotor 20 coaxially with the shaft 18. Each of the fans 72, 74 has a plurality of blades which are configured to allow air to flow in directions represented with arrows 78.

As depicted in FIG. 2, the slip ring assembly 22 has an annular base 80, a pair of slip rings 83, 84 and a pair of slip ring leads 86, 88. The base 80 is mounted to the serrated end 56 of the shaft 18; and has recesses 81, 82 which are configured to accommodate the slip ring leads 86, 88. The slip rings 83, 84 are fixed to the base 80; and the slip ring leads 86, 88 are attached thereto, respectively. The slip ring leads 86, 88 extend from the slip rings 83, 84; and are connected to the rotor coil leads 68, 70. End portions of the slip ring leads 86, 88 and the coil leads 68, 70 are held by a lead holder 130 which is attached to the rotor 20, as will be further described below with reference to FIGS. 5 and 6.

Referring again to FIG. 2, on the outside of the first frame 12, there are arranged the brushes 24, 26, a brush holder 28 for retaining the brushes 24, 26, and other components, e.g., an IC regulator 90. These structural components are enclosed by an outer cover 150 which is mounted to the first frame 12. The outer cover 150 has vents 152.

The brushes 24, 26 are urged against the slip rings 83, 84 by brush springs 94 to come in sliding contact with the slip rings 83, 84. The brushes 24, 26 are made of, e.g., a graphite. Brush leads 96, 98 are attached to the brushes 24, 26, respectively.

Still referring to FIG. 2, the brush holder 28 has a slip ring shield portion 100, which is shaped cylindrically to cover and protect the slip ring assembly 22. The slip ring shield portion 100 has a first opening 102 distant to the first frame 12; and a second opening 104 adapted to serve as a passage for the slip ring assembly 22 and the shaft 18. The second opening 104 communicates with the first aperture 32 of the first frame 12 to allow dust produced by the wearing of brushes 24, 26 to be blown or removed from the inside of the slip ring shield portion 100 by air flow. A seal element 106 is preferably positioned between the first frame 12 and the brush holder 28 for preventing contaminants, e.g., moisture or oil, from flowing into the slip ring shield portion 100.

The slip ring shield portion 100 has a cylindrical lip 108 extending outwardly from a periphery of the first opening 102. The outer cover 150 has a cylindrical projection 154 surrounding the lip 108. The projection 154 extends axially inwardly from a wall of the cover 150 and beyond an end of the lip 108; and is spaced radially outwardly from the lip 102 and axially from the brush holder 28 to be in an overlapping relation with the lip 108. This relation of the lip 108 and the projection 154 allows air to flow into the slip ring shield portion 100 through the first opening 102; but prevents contaminants from flowing into the slip ring shield portion 100.

The brush holder 28 has a pair of radial apertures 110 for accommodating the brushes 24, 26 and the springs 92. Also, the brush holder 28 has two inserts 114, 116 serving as terminals. The inserts 114, 116 are made of, e.g., a copper alloy. Each of the inserts has a first end portion protruding upwardly from the brush holder 28 to be connected to each of the brush leads 96, 98 by way of, e.g., soldering; and a second end portion projecting outwardly from a side of the brush holder 28 to be connected to the IC regulator 90.

The brush holder 28 has a plug 120 to cover top portions of the apertures 110. The plug 120 has holes 122 through which the brush leads 96, 98 and terminals 114, 116 pass. The plug 120 is fixed to the brush holder by way of, e.g., deforming plastically the ends of the inserts 114, 116 which extend beyond the plug 120. A cap 124 is mounted to a top portion of the brush holder 28 to protect the inside thereof against the contaminants. The plug 120 has a partition 126 to isolate one of the terminals from the other. This structure prevents short-circuiting of the terminals caused by brush dust. The body of the brush holder 28, the plug 120, and the cap 124 are made of, e.g., a synthetic plastic resin. The brush holder 28 is fixed to the first frame 12 by a plurality of bolts (not shown.)

Figure 3:
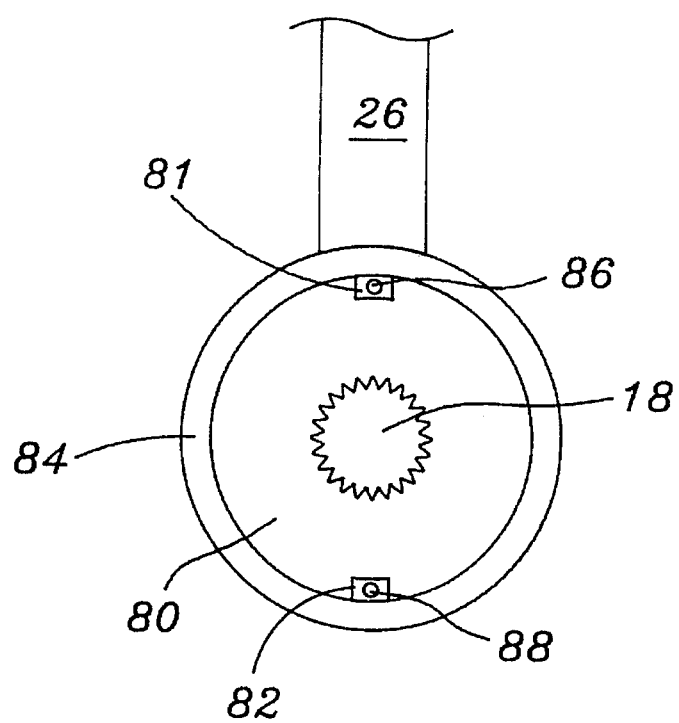
FIG. 3 represents a sectional view taken along line III—III of FIG. 2.
Figure 4:
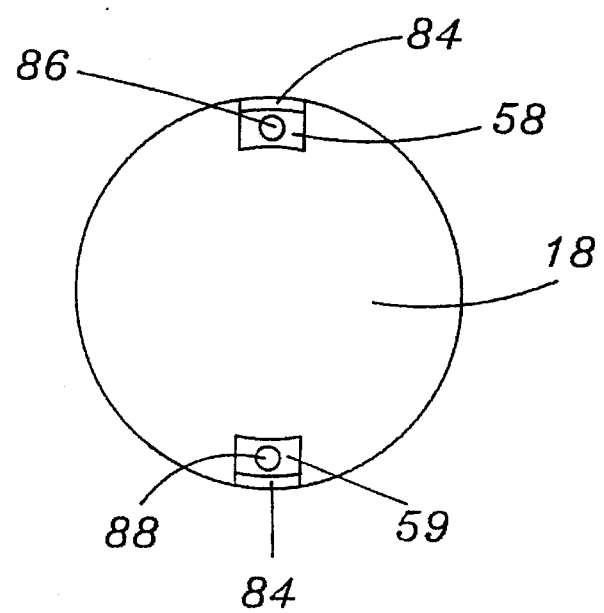
FIG. 4 provides a sectional view taken along line IV—IV of FIG. 2.

As shown in FIGS. 3 and 4, the slip ring leads 86, 88 are accommodated in the recesses 81, 82 of the base 80 and the channels 58, 59 of the shaft 18 for the protection thereof against damaging or disruption.

Figure 5:
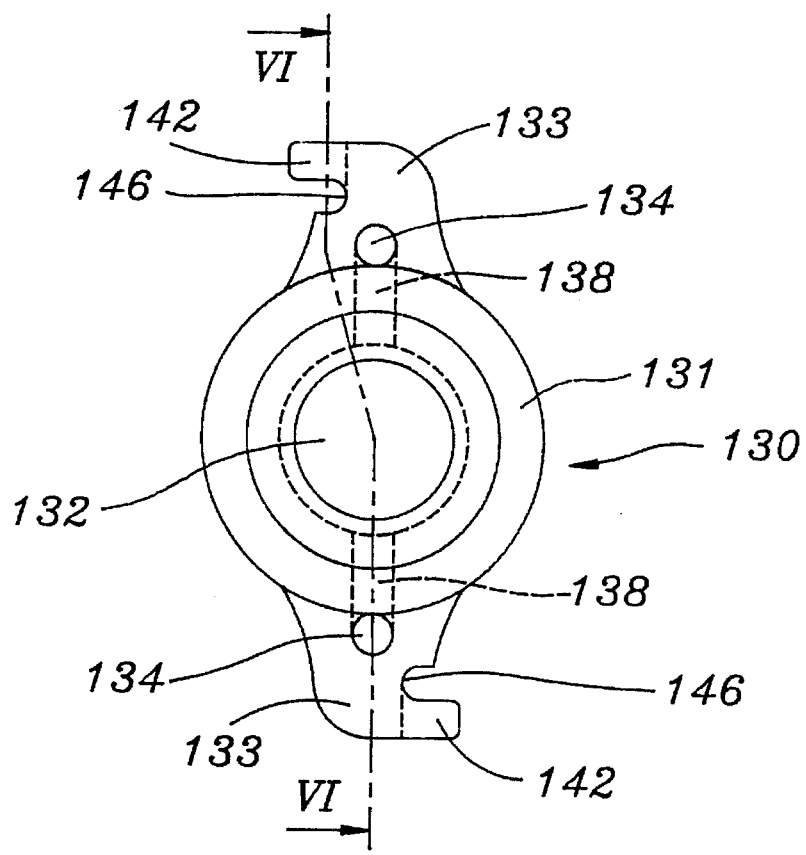
FIG. 5 offers a front view of the lead holder depicted in FIG. 2.
Figure 6:
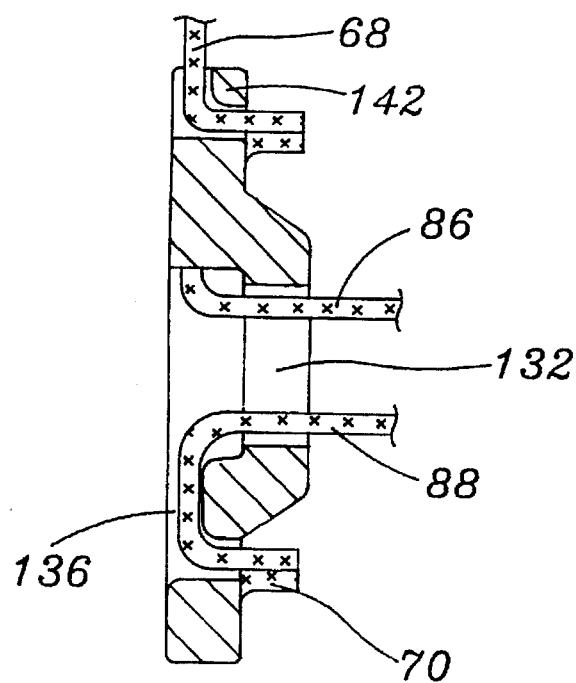
FIG. 6 presents a sectional view taken along line VI—VI of FIG. 5.

Referring now to FIGS. 5 and 6, the lead holder 130 has a circular body 131; and wings 133 diametrically positioned. The body 131 has an aperture 132 at a center portion thereof. Each of the wings 133 has a hole 134. The lead holder 130 has grooves 138 extending from the body 131 to the hole 134. A guide tab 142 protrudes from an end portion of each wing 133. Each of the wing 133 has a notch 146 adjacent the tab 142. Each of the slip ring leads 86, 88 is held and guided by each groove 138 and each hole 134; and each of the rotor coil leads 68, 70 is guided by each tab 142 and notch 146. The leads 68, 70, 86, 88 may be bonded to the lead holder by using an adhesive. The end of each of the slip ring leads is coupled to the end of each of the rotor coil leads by way of, e.g., soldering.

Although the invention has been shown and described with respect to the exemplary embodiments, it should be understood that various changes, modifications and additions may be made without departing from the spirit and scope of the invention.

What is claimed is:

1. An alternator for use in an automobile, which comprises:

a first frame having apertures;

a second frame engaged to the first frame;

a stator positioned between the first and the second frames;

a shaft coupled to the first and the second frames, the shaft including a first portion positioned between the first and the second frames and a second portion extending outwardly from the first portion and beyond the first frame, the shaft being rotatable with respect to the first and the second frames about an axis thereof;

a rotor mounted on the shaft, the rotor including a rotor core and a rotor coil for establishing an electromagnetic cooperation with the stator;

a pair of slip rings fixed to the second portion of the shaft, each of the slip rings being electrically connected to the rotor coil;

a pair of brushes, each of the brushes being urged against and in slidable contact with each of the slip rings;

a brush holder mounted to first frame for retaining the brushes, the brush holder including a slip ring shield portion, the slip ring shield portion having a first opening distant to the first frame and a second opening adapted to serve as a passage for the slip rings and the shaft, the second opening being in communication with one of the apertures of the first frame; and means for circulating air through the first and the second openings of the brush holder;

wherein each of the brushes includes a brush lead attached thereto, and the brush holder further includes a pair of radial apertures, a pair of terminals, each of the terminals being connected to each of the brush leads, a plug covering a top portion of each of the radial apertures and having a pair of bores for the brush holder and a partition so as to isolate one of the terminals from the other, and a cap mounted to a top portion of the brush holder.

2. The alternator of claim 1, further comprising an outer cover attached to the first frame, the outer cover including a vent and enclosing the brush holder.

3. The alternator of claim 2, wherein said slip ring shield portion of the brush holder has a lip extending outwardly from a periphery of the first opening thereof, and said outer cover further includes a projection, said projection surrounding the lip and being spaced radially from the lip and axially from the brush holder.

4. The alternator of claim 1, further comprising a seal element positioned between the first frame and the brush holder.

* * * * *